(12) United States Patent
Jacob et al.

(10) Patent No.: US 6,261,184 B1
(45) Date of Patent: Jul. 17, 2001

(54) CONSTANT VELOCITY JOINT

(75) Inventors: Werner Jacob, Frankfurt; Achim Jacob, Kiel, both of (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/501,428

(22) Filed: Feb. 10, 2000

(30) Foreign Application Priority Data

Feb. 10, 1999 (DE) ............................................. 199 05 451

(51) Int. Cl.$^7$ ................................................... F16D 3/223
(52) U.S. Cl. ...................... 464/146; 464/145; 464/906
(58) Field of Search .................................. 464/139, 148, 464/141, 142, 143, 144, 145, 146, 100, 906

(56) References Cited

U.S. PATENT DOCUMENTS

| | | | | |
|---|---|---|---|---|
| 2,646,669 | * | 7/1953 | Barbier | 464/145 |
| 2,822,880 | * | 2/1958 | Gregory | 464/139 |
| 3,237,429 | * | 3/1966 | Henry-Biabaud | 464/145 |
| 3,310,960 | * | 3/1967 | Cull | 464/139 |
| 3,447,341 | * | 6/1969 | Miller, Jr. | 464/144 |
| 3,475,924 | * | 11/1969 | Aucktor | 464/145 |
| 3,875,762 | * | 4/1975 | Tampalini | 464/145 |
| 5,221,233 | * | 6/1993 | Jacob | 464/145 |

FOREIGN PATENT DOCUMENTS

| | | |
|---|---|---|
| 1 170 720 | 6/1960 | (DE) . |
| 40 31 819 C1 | 10/1990 | (DE) . |
| 42 08 786 C1 | 3/1992 | (DE) . |
| 43 19 885 A1 | 6/1993 | (DE) . |
| 196 33 216 C1 | 8/1996 | (DE) . |
| 2 232 700 | 6/1974 | (FR) . |
| 0 962 454 | 7/1964 | (GB) . |
| 2 116 672 | 9/1983 | (GB) . |
| 1 480 462 | 7/1997 | (GB) . |
| 61-167720 | 7/1986 | (JP) . |

* cited by examiner

Primary Examiner—Lynne H. Browne
Assistant Examiner—Kenn Thompson

(57) ABSTRACT

The invention relates to a constant velocity joint having a plate-metal slotted, annular outer part 13 which comprises first outer running grooves 15 and second outer running grooves 17 extending in opposite directions and which is received in a receiving part 19. Furthermore, the constant velocity joint comprises an inner part 3 with first inner running grooves 6 and second inner running grooves 7. Between said outer part and inner part, there is arranged a cage 11 which serves to guide balls 28 which engage the respective running grooves. The outer part 13 which is divided and consists of segments is secured in the receiving part 19 in the axial direction and in the circumferential direction. The constant velocity joint in the above design is easy to produce from plate metal by simple tools.

13 Claims, 3 Drawing Sheets

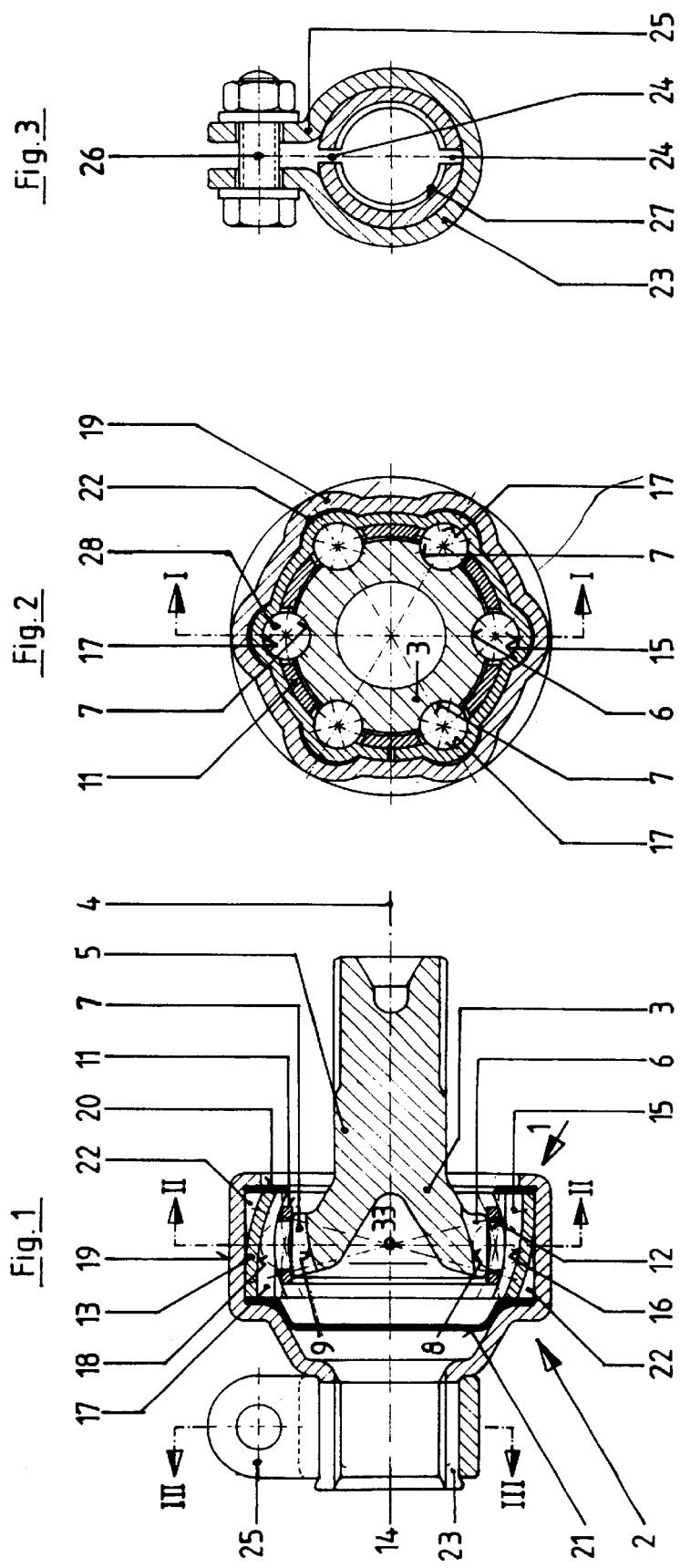

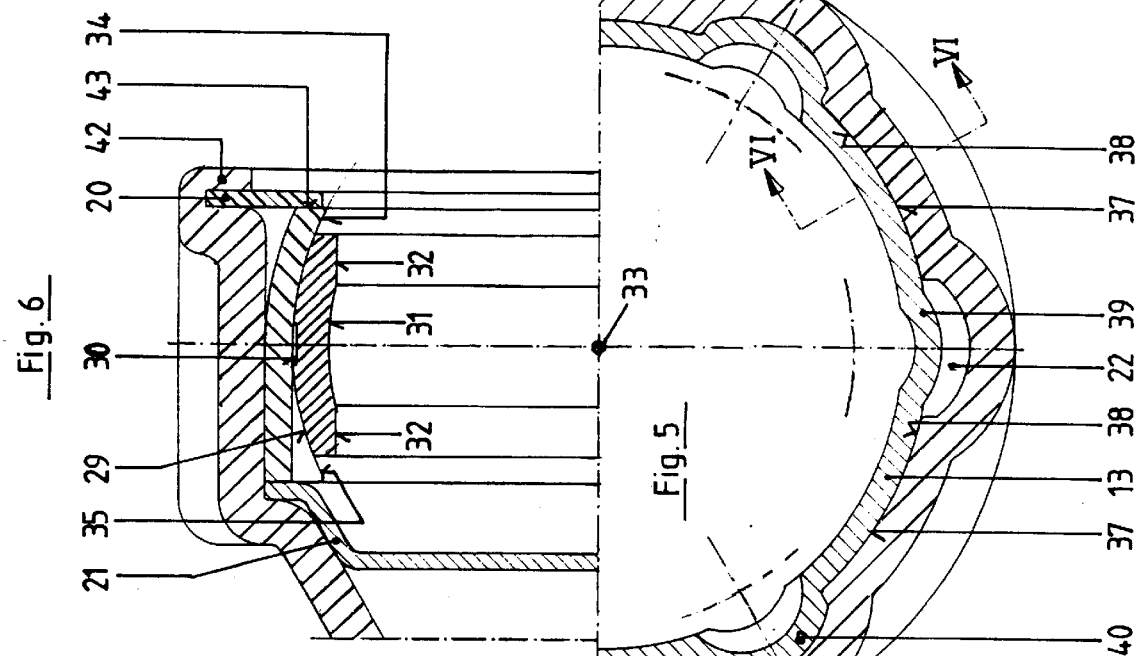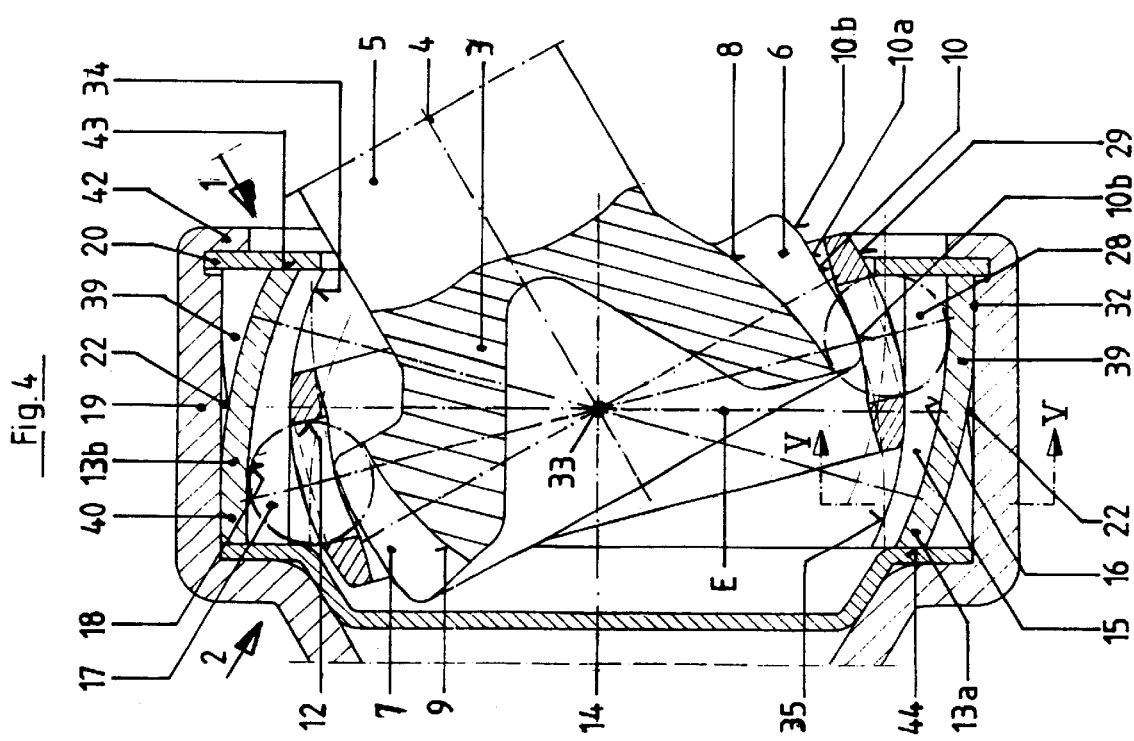

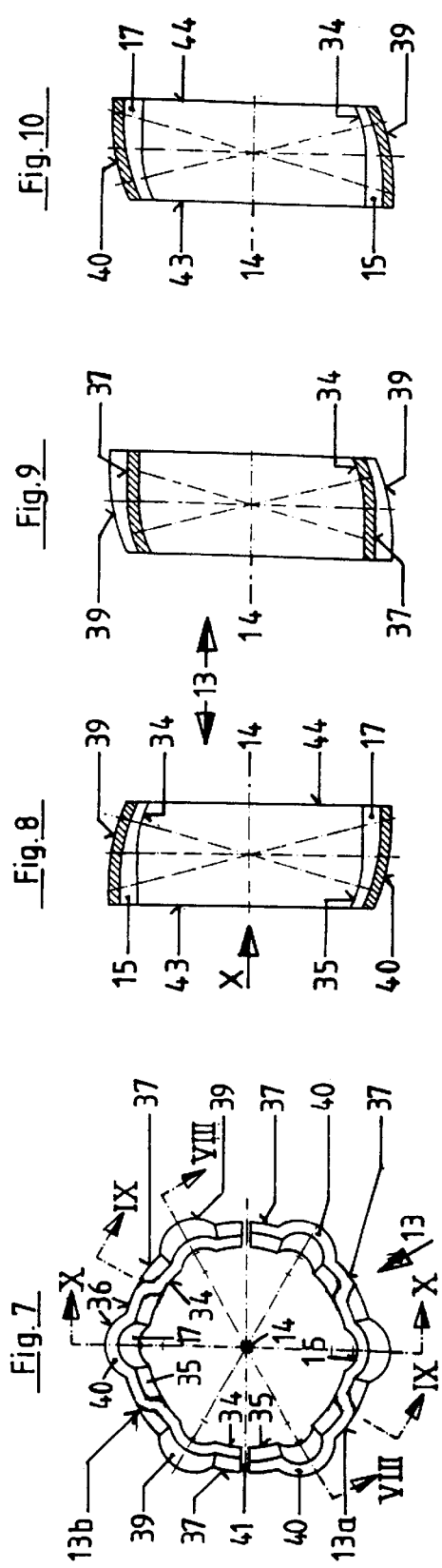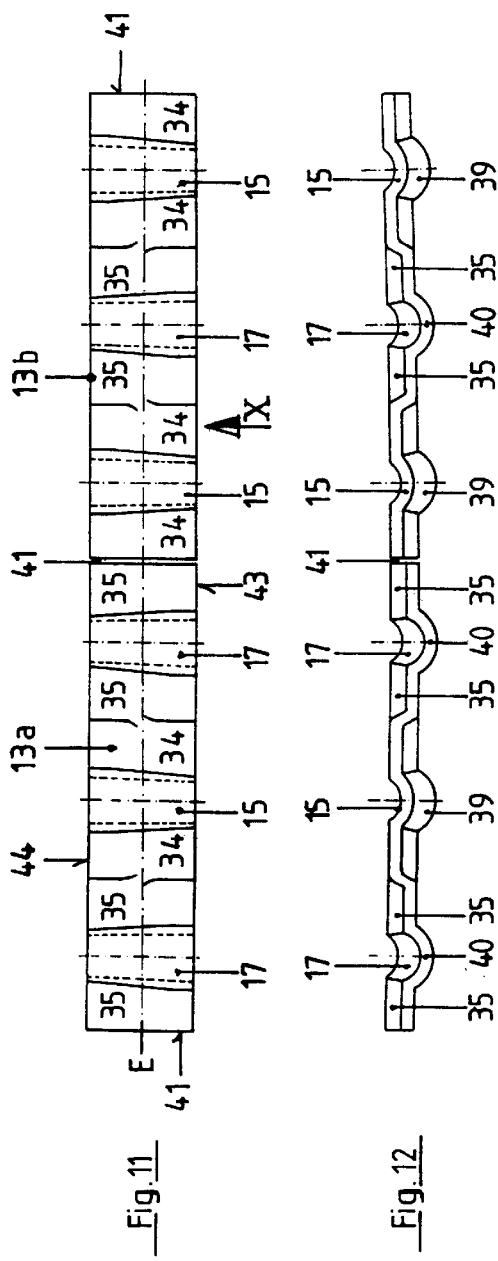

CONSTANT VELOCITY JOINT

BACKGROUND OF THE INVENTION

The invention relates to a constant velocity joint, especially for steering a motor vehicle.

In particular, constant velocity joints are used in the driveline of a motor vehicle such as, for example, in the side shafts between the differential and the wheels to be driven; or in the propeller shaft between the gearbox output positioned in front, and the axle drive arranged at the rear axle.

DE 40 31 819 C1 describes a joint for large articulation angles and high torque values, for example, wherein the outer part is provided with alternating first and second outer running grooves, and the inner part is provided with alternating first and second inner running grooves. The first outer running grooves and first inner running grooves start from a first open end, and extend in an undercut-free way towards the second open end, whereas the second outer running grooves and the second inner running grooves extend from the opposed open end in an undercut-free way. The joint thus comprises tracks which alternately extend in opposite directions on the circumference. Between the outer part and inner part, there is arranged a cage. By means of a hollow spherical face, the cage is arranged centrically relative to the spherical outer face of the inner part. Furthermore, the cage, by means of its spherical outer face, is arranged concentrically relative to the spherical inner face of the outer part. The spherical inner face of the outer part is formed by first and second partial inner faces. The first partial inner faces start and extend, in an undercut-free way, from the open end from which the first outer running grooves extend in an undercut-free way. The second partial inner faces start from and extend, in an undercut-free way, from the second open end of the outer part, from which the outer running grooves extend in an undercut-free way. With the first and second outer running grooves and first and second inner running grooves alternately following one another, the first and second partial inner faces are arranged in the region of the webs between two circumferentially adjoining first and second outer running grooves in such a way that the first partial inner faces directly adjoin the first outer running grooves, and the second partial inner faces directly adjoin the second outer running grooves, and abut one another in the central region between first and second outer running grooves. The outer part is a solid part and can be produced by precision forming. The same applies to the inner part.

With regard to the foregoing joint, after the outer part has been produced to its final dimensions, it is typically broken into two individual annular segments by applying radial pressure. In this way, during assembly, after the cage has been slid on to the inner part by means of its hollow spherical face, the balls can be inserted into the windows from the outside. Subsequently, the two annular segments are mounted radially, and the unit, by means of the outer face of the outer part, is inserted into a bore of a bell. The bell supports the outer part in the radial direction. To achieve a rotationally fast connection, there are provided recesses in one of the end faces which form the open ends. After the unit has been inserted, the wall of the bell is deformed in such a way that it extends over an end face forming the open end, with material entering the region of the recesses. In this way, there is produced a rotationally fast connection. While it is true that producing such components by precision forming is less expensive than embodiments which start from a forged blank and have to be machined in a chip-forming way, the costs are still very high. This is especially true for constant velocity joints which are used for the transmission of low torque values only and at low speeds.

SUMMARY OF THE INVENTION

It is therefore an object of the present invention to provide a constant velocity joint of the above-described type which is characterized by low production costs.

In accordance with one embodiment of the present invention, the foregoing object is achieved by providing a constant velocity joint comprising a first axial end and a second axial end, and having an annular outer part. The annular outer part comprises a longitudinal outer part axis, and first outer running grooves and second outer running grooves which are alternately arranged around the longitudinal outer part axis. The first outer running grooves start from the first end and extend towards the second end, with the track bases of same approaching the longitudinal outer part axis towards the second end. Furthermore, the second outer running grooves start from the second end and extend towards the first end, with the track bases of same approaching the longitudinal outer part axis towards the first end. Preferably, the outer part is produced from at least one planar plate metal part which, after the first outer running grooves and second outer running grooves have been formed in a non-chip producing way, is bent into an open ring which may include one or more annular segments. In addition, the outer part, towards the first end and towards the second end, is provided with centering faces on its outer face between the first outer running grooves and the second outer running grooves.

The constant velocity joint of the present invention further includes a receiving part which is provided in the form of a closed ring. The receiving part comprises a cylindrical bore interrupted by grooves. The number of grooves correspond to the number of first and second outer running grooves. The grooves circumferentially receive, in a form-fitting way, at least axial partial portions of the outwardly projecting formations of the outer part in the region of the first outer running grooves and second outer running grooves. Furthermore, the outer part is held in the axial direction between stops relative to the receiving part.

The constant velocity joint of the present invention further includes an inner part which comprises a longitudinal inner part axis, and an outer face in which first inner running grooves and second inner running grooves are alternately distributed around the longitudinal inner part axis. The first inner running grooves are positioned opposite first outer running grooves forming pairs therewith. The first inner running grooves start from the first end and extend towards the second end, with their track bases moving away from the longitudinal inner part axis. Whereas the second inner running grooves start from the second end and extend towards the first end, with the track bases of same moving away from the longitudinal inner part axis.

The constant velocity joint of the present invention also includes a cage which is arranged between the outer part and the inner part, and is provided with radial windows. The joint also includes balls which are guided in the windows of the cage and which are each engaged by pair-forming first outer running grooves, and first inner running grooves and pair-forming second outer running grooves and second inner running grooves.

The advantage of the foregoing embodiment is that the design allows advantageous production conditions. For example, it is possible to start from a high-quality plate metal strip which, by punching, stamping and bending, can cost-effectively be given a pre-shape. The final shape can be achieved by placing the bent plate metal strip onto a mandrel comprising the inner contour of the outer part and by pulling same through a tool containing the final outer contour. In the process, it is possible to produce the final dimensions of the centering seat which is located only on outer portions of the formations in which the outer running grooves are provided. The annular segments are not provided with a direct counter-support along the whole length of the outer running grooves, but the specific shape ensures a relatively high degree of stiffness. On the other hand, a limited amount of elasticity for cage guiding purposes is advantageous, so that it is possible to achieve narrow tolerances.

In this way, it is possible to produce a joint which is practically play-free, which means that the constant velocity joint is particularly advantageous for those applications wherein the play-free nature of the joint is particularly important. For this purpose, it is proposed according to a further embodiment of the invention that the outer part, between each two first outer running grooves and second outer running grooves following one another on the inner circumference, is provided with spherical first guiding faces and second guiding faces. In this embodiment, the first spherical guiding faces are arranged so as to laterally adjoin a central cross-sectional plane of the outer part towards the second end face and towards the second end and, in the circumferential direction, adjoin the first outer running grooves. The second spherical guiding faces are arranged so as to laterally adjoin the central cross-sectional plane of the outer part towards the first end face and the first end, and, in the circumferential direction, adjoin the second outer running grooves. In this case, the cage comprises a spherical outer face by means of which it is guided between the first spherical guiding faces and the second spherical guiding faces.

In order to ensure that there is no self-inhibition, the outer face of the cage is provided with a continuously extending groove which is located in a plane containing the centers of the balls received in the cage.

To achieve the required articulation angle, the inner face of the cage is provided with a hollow spherical recess. In a preferred embodiment, cylindrical inner faces are provided on both sides of the hollow spherical recess. To facilitate the assembly of the inner part, the outer face of same, in its center, is provided with a cylindrical portion which permits the inner part to be inserted through the cylindrical inner face. The cylindrical portion, on both sides, is followed by spherical portions which enter the region of the hollow spherical recess of the cage when the inner part is articulated relative to the cage.

To secure the outer part to the receiving part, there is provided at least one holding disc which is arranged on one side of the outer part. However, in a preferred embodiment, there are provided two holding discs between which the annular segments of the outer part are held in the axial direction. One of said holding discs can additionally serve as a cover for the receiving part in one direction. To achieve a rotationally fast connection between the receiving part and a driving or driven component, the receiving part is provided with a projection which comprises an attaching bore. The projection can be slotted in the longitudinal direction and it can be provided with a fixing clip to provide a connection with a journal.

The receiving part is preferably provided as a formed plate metal part.

BRIEF DESCRIPTION OF THE DRAWINGS

One embodiment of the inventive constant velocity joint is illustrated in the accompanying drawings and explained below with reference thereto.

In the drawings:

FIG. 1 is a longitudinal section of a constant velocity joint in the aligned position according to sectional line I—I of FIG. 2.

FIG. 2 is a cross-section according to sectional line II—II of FIG. 1.

FIG. 3 is a cross-section through the projection of the receiving part and the fixing clip according to sectional line III—III of FIG. 1.

FIG. 4 is a longitudinal section through part of the joint according to FIG. 1 in an enlarged scale, with the inner part being in an articulated position relative to the outer part.

FIG. 5 is half a section according to sectional line V—V of FIG. 4.

FIG. 6 is a section VI—VI according to FIG. 5.

FIG. 7 is a plan view of the outer part as an individual component consisting of two annular segments.

FIG. 8 is a section VIII—VIII according to FIG. 7.

FIG. 9 is a section IX—IX according to FIG. 7.

FIG. 10 is a section X—X according to FIG. 7.

FIG. 11 is a plan view of the two articulated annular segments of the outer part prior to being bent into the shape of annular segments.

FIG. 12 is a plan view in the direction of arrow X according to FIG. 11.

DESCRIPTION OF A PREFERRED EMBODIMENT

Below, FIGS. 1 to 3 will be described jointly. To be able to explain more easily the way in which the various parts are associated with one another and aligned, the first end of the joint has been given the reference number 1 and the second end of the joint the reference number 2. "End" in this context does not mean a defined end on a specific line or in a specific point, but it refers to the individual parts and their alignment and configuration.

The constant velocity joint comprises an inner part 3 with a longitudinal inner part axis 4. A journal 5 connectable by toothing to a driving or driven part is formed on to the inner part 3. Said driving or driven part could be the intermediate shaft of a propeller shaft, for example. Into the solid inner part 3, there are formed first inner running grooves 6 and second inner running grooves 7 which are open towards the outer face of the inner part 3. The first inner running grooves 6 start in an undercut-free way from the first axial end 1 and their track bases 8 extend towards the second axial end 2, with their distance from the longitudinal inner part axis 4 increasing. The second inner running grooves 7 start in an undercut-free way from the second end and extend towards the first axial end 1, with their track bases 9 extending towards the first axial end 1 and moving away from the longitudinal inner part axis 4. The first inner running grooves 6 and the second inner running grooves 7 extend between the two axial ends 1, 2 in planes which contain the longitudinal inner part axis 4, and are circumferentially distributed relative thereto.

The annular cage 11 is arranged around the outer face 10 of the inner part 3 and comprises windows 12 in the form of radial apertures which are distributed in accordance with the first inner running grooves 6 and the second inner running grooves 7.

The inner part 3 and the cage 11 are jointly received in the cavity of an outer part 13. The outer part 13 comprises a longitudinal outer part axis 14. The outer part 13 may be one piece in the form of an open ring or, as will be explained below in connection with FIGS. 4 to 12, the outer part 13 may comprise two or more annular segments. Into the outer part 13, there are formed first outer running grooves 15 which start from the first axial end 1 in an undercut-free way and extend towards the second axial end 2, with the track bases 16 of the first outer running grooves 15, towards the second axial end 2, approaching the longitudinal outer part axis 14. On the circumference, there are arranged second outer running grooves 17 which circumferentially alternate with the first outer running grooves 15 and which, while starting from the second axial end 2, extend towards the first axial end 1 in an undercut-free way, with their track bases 18, while starting from the second axial end 2, approaching the longitudinal outer part axis 14 towards the first axial end 1. The outer part 13 is produced from high-quality plate metal, so that, substantially, it comprises a uniform wall thickness across its circumference.

The outer part 13 and, respectively, its segments are firmly received in a receiving part 19 which is dish-shaped and is produced in a non-chip forming way from plate metal. In the axial direction, the outer part 13 is non-displaceably held between holding discs 20, 21. For transmitting torque between the outer part 13 and the receiving part 19, formations on the outer part 13 in the region of first outer running grooves 15 and second outer running grooves 17 engage grooves 22 in the receiving part 19.

Furthermore, the receiving part 19 comprises a tubular projection 23 which comprises two slots 24. As can be seen particularly clearly in FIG. 3, a fixing clip 25 may be positioned on the projection 23. The attaching bore 27 of the projection 23 is toothed and serves to be secured to a drive journal or a similar component by means of the fixing clip 25 which, together with a tensioning screw 26, serves to clamp on the projection 23.

Furthermore, there are provided balls 28 which each engage a pair of first inner running grooves 6 and first outer running grooves 15, as well as a pair of second inner running grooves 7 and second outer running grooves 17. The balls 28 are received in the windows 12 of the cage 11 and project radially inwardly and outwardly therefrom for the purpose of engaging the outer and inner running grooves.

Now, FIGS. 4 to 12 will be described jointly, with reference being made to any special features given in the individual Figures. FIG. 4 shows an inner part 3 being articulated relative to the outer part 13, with the longitudinal inner part axis 4 assuming an angle of approximately 30° relative to the longitudinal outer part axis 14. Furthermore, in addition to the description of FIGS. 1 to 3, it can be seen that the outer face 10 of the inner part 3 comprises three portions, with the central portion 10a comprising a cylindrical contour which is centered on the longitudinal inner part axis 4. This means that there exist cylindrical partial faces in the region of the webs between two first inner running grooves 6 and second inner running grooves 7 following one another on the circumference of the outer face 10. Towards the first axial end 1 and towards the second axial end 2, there are provided spherical portions 10b which adjoin the cylindrical portions 10a and whose center is centered on the joint articulation center 33. Furthermore, it can be seen that the cage 11, in its inner face, is provided with a hollow spherical recess 31 which can be entered by the spherical portions 10b when the inner part 3 is articulated relative to the outer part 13, as shown in FIG. 4. The center of the spherical recess 31 is also centered on the joint articulation center 33.

Towards the axial ends of the cage 11, there are provided two cylindrical inner faces 32 whose diameter is adapted to that of the cylindrical portion 10a in such a way that the inner part 3 can be axially inserted into the cage 11. Furthermore, the cage 11 comprises a spherical outer face 29 whose center is also centered on the joint articulation center 33. By means of its outer face 29, the cage 11 is guided between first guiding faces 34 and second guiding faces 35 which are arranged laterally with reference to a plane containing the joint articulation center 33. The two segments 13a, 13b of the outer part 13, towards their end faces 43, 44, are provided with centering faces 37 arranged between two formations 39, 40 containing the first outer running grooves 15 and second outer running grooves 17 by means of which they are held in a centered way in a corresponding cylindrical centering bore 38 of the receiving part 19. In the axial direction, they are secured relative to the receiving part 19 by the first holding disc 20 arranged towards the first axial end 1 and by a collar 42. Towards the second axial end 2, a second holding disc 21 rests against the end face 44 and is provided in the form of a cover, i.e. it closes the joint interior towards the projection 23. The formations 39, 40 of the outer face 36 of the outer part 13, which formations extend in opposite directions, at least by means of their end portions arranged toward the end faces 43, 44, form-fittingly engage the circumferentially distributed grooves 22 of the receiving part 19 for the purpose of transmitting torque.

In FIGS. 7 to 12, the outer part 13 is turned, for example, around an axis represented by the sectional line X—X by 180° relative to the assembly shown in FIG. 4. It can be seen that the outer part 13 consists of the two segments 13a, 13b, with the first outer running grooves 15 and the second outer running grooves 17 being formed into said segments 13a, 13b. Furthermore, towards the first inner running grooves 15, there are provided circumferentially adjoining faces. Towards the end face 43, there are provided spherical first guiding faces 34, i.e. they are positioned between the plane E and the end face 43 so as to directly circumferentially adjoin the first outer running grooves 15. Spherical second guiding faces 35 are formed into the faces which circumferentially adjoin the second inner running grooves 17, and are arranged between the plane E and the end face 44. The outer part 13 and its segments 13a, 13b are produced from a high-quality plate metal strip by punching, stamping and bending and subsequent calibration by means of a drawing-through operation. The first inner running grooves 15 and the second inner running grooves 17 and well as the spherical guiding faces 34, 35 are formed into a high-quality plate metal strip. The plate metal strip is subsequently transformed into the shape of annular segments.

Between the two segments 13a, 13b of the outer part 13, there is provided a slot 41. By providing a divided embodiment of an outer part produced from plate metal strip or an outer part 13 formed of several segments 13a, 13b, in connection with the receiving part 19, it is possible to achieve an easy and cost-effective production method, in spite of tracks extending in opposite directions and first guiding faces 34 and second guiding faces 35 extending in opposite directions. By guiding the cage 11 by means of its outer face 29 between the first guiding faces 34 and the second guiding faces 35 it is additionally possible to achieve play-free conditions. Furthermore, by supporting the outer part 13 by means of its formations 39, 40 in the grooves 22 of the receiving part 19, there is provided a limited degree of elasticity for the play-free support of the cage 11, without there occurring any jamming. In order to ensure, that, in addition, the cage 11 can be articulated without there occurring any self-inhibition, the outer face 29 is provided with a groove 30 which is wide enough to ensure that there cannot occur any contact within the range of self-inhibition with the first guiding faces 34 and the second guiding faces 35.

The receiving part 19 is also provided in the form of a plate metal part and can be produced by deep-drawing for instance. In the circumferential direction and in the longitudinal direction it comprises substantially a uniform wall thickness, with the exception of the region which serves to secure the first holding disc 20. The second holding disc 21 rests against an axial stop face inside the receiving part 19; it ensures a planar contact of the end face 44 of the outer part 13. In this way, it is possible to permit radius transitions in the region of transition between the portion of the receiving part 19 containing the grooves 22 and the transition to the projection 23, which radius transitions permit crack-free deformation.

From the foregoing, it will be seen that there has been brought to the art a new and improved constant velocity joint which has advantages for manufacturability. While the invention has been described in connection with one or more embodiments, it is to be understood that the invention is not limited to those embodiments. On the contrary, the invention covers all alternatives, modifications, and equivalents as may be included within the spirit and scope of the appended claims.

What is claimed is:

1. A constant velocity joint having a first axial end (1) and a second axial end (2), comprising:

an annular outer part (13) which comprises a longitudinal outer part axis (14) and first outer running grooves (15) and second outer running grooves (17) which are alternately arranged around the longitudinal outer part axis (14), wherein the first outer running grooves (15) start from the first axial end (1) and extend towards the second axial end (2), with the track bases (16) of same approaching the longitudinal outer part axis (14) towards the second axial end (2), and wherein, furthermore, the second outer running grooves (17) start from the second axial end (2) and extend towards the first axial end (1), with the track bases (18) of same approaching the longitudinal outer part axis (14) towards the first axial end (1), wherein, furthermore, the outer part (13) is produced from at least one planar plate metal part which, after the first outer running grooves (15) and second outer running grooves (17) have been formed in a non-chip producing way, is bent into an open ring, and wherein the outer part (13), towards the first axial end (1) and towards the second axial end (2), is provided with centering faces (37) on its outer face (36) between the first outer running grooves (15) and the second outer running grooves (17) and wherein the outer part (13) includes a plurality of outwardly projecting formations (39, 40) in the region of the first outer running grooves (15) and second outer running grooves (17);

a receiving part (19) which is provided in the form of a closed ring and comprises a cylindrical bore (38) interrupted by grooves (22), with the number of grooves (22) corresponding to the number of first and second outer running grooves (15, 17) and with the grooves (22) circumferentially receiving in a form-fitting way at least axial partial portions of the outwardly projecting formations (39, 40) of the outer part (13) in the region of the first outer running grooves (15) and second outer running grooves (17) and wherein, furthermore, the outer part (13) is held in the axial direction between stops (20, 21) relative to the receiving part (19);

an inner part (3) which comprises a longitudinal inner part axis (4) and an outer face (10) in which first inner running grooves (6) and second inner running grooves (7) are alternately distributed around the longitudinal inner part axis (4) and wherein the first inner running grooves (6) are positioned opposite first outer running grooves (15) and the second inner running grooves (7) are positioned opposite second outer running grooves (17) while forming pairs therewith, wherein the first inner running grooves (6) start from the first axial end (1) and extend towards the second axial end (2), with their track bases (8) moving away from the longitudinal inner part axis (4) and wherein the second inner running grooves (7) start from the second axial end (2) and extend towards the first axial end (1), with the track bases (9) of same moving away from the longitudinal inner part axis (4);

a cage (11) arranged between the outer part (13) and the inner part (3) including a plurality of radial windows (12); and balls (28) which are guided in the windows (12) of the cage (11) and which are each engaged by pair-forming first outer running grooves (15) and first inner running grooves (6) and pair-forming second outer running grooves (17) and second inner running grooves (7).

2. A constant velocity joint according to claim 1, wherein the outer part (13) having an inner circumference, between each two first outer running grooves (15) and second outer running grooves (17) following one another on the inner circumference, is provided with spherical first guiding faces (34) and second guiding faces (35), wherein the first guiding faces (34) are arranged so as to laterally adjoin a central cross-sectional plane (E) of the outer part (13) towards the second end face (44) and towards the second axial end (2) and, in an circumferential direction, so as to adjoin the first outer running grooves (15), and wherein the second guiding faces (35) are arranged so as to laterally adjoin the central cross-sectional plane (E) of the outer part (13) towards the first end face (43) and towards the first axial end (1) and, in the circumferential direction, so as to adjoin the second outer running grooves (17), and wherein the cage (11) comprises a spherical outer face (29) by which the cage (11) is guided between the first guiding faces (34) and the second guiding faces (35).

3. A constant velocity joint according to claim 2, wherein the cage (11) comprises a continuously extending groove (30) in its outer face (29).

4. A constant velocity joint according to claim 1, wherein the cage (11) comprises an inner face having a hollow-spherical recess (31).

5. A constant velocity joint according to claim 4, wherein on both sides of the hollow-spherical recess (31), the cage (11) is provided with a cylindrical inner face (32).

6. A constant velocity joint according to claim 1, wherein the inner part (3) comprises a cylindrical portion (10*a*) on its outer face (10).

7. A constant velocity joint according to claim 6, wherein, on both sides of the cylindrical portion (10), there is provided a spherical portion (10*b*).

8. A constant velocity joint according to claim 1, wherein at least on one side, the outer part (13) is secured by a holding disc (20, 21) in the receiving part (19).

9. A constant velocity joint according to claim 1, wherein the receiving part (19) is provided with a projection (23) comprising an attaching bore (27).

10. A constant velocity joint according to claim 9, wherein the projection (23) is slotted in the longitudinal direction and carries a fixing clip (25).

11. A constant velocity joint according to claim 8, wherein the holding disc (21) closes the interior of the receiving part (19) at the second axial end (2) of same.

12. A constant velocity joint according to claim 1, wherein the receiving part (19) is provided in the form of a formed plate metal part.

13. A constant velocity joint according to claim 1, wherein the outer part (13) comprises two annular segments (13a, 13b).

* * * * *